United States Patent [19]

Votava et al.

[11] Patent Number: 5,715,124
[45] Date of Patent: Feb. 3, 1998

[54] SYSTEM AND METHOD OF ISOLATION FOR DETECTING A PASSIVE PROTECTIVE FUNCTION FAILURE FOR AN ELECTRIC POWER GENERATING SYSTEM

[75] Inventors: Robert Scott Votava, Rockford; Ken I. Spear, Belvidere, both of Ill.

[73] Assignee: Sundstrand Corporation, Rockford, Ill.

[21] Appl. No.: 628,839

[22] Filed: Apr. 8, 1996

[51] Int. Cl.⁶ ............................................. H02H 7/00
[52] U.S. Cl. ........................ 361/20; 361/63; 361/93; 361/115
[58] Field of Search ............................ 361/20, 63, 87, 361/18, 93, 115

[56] References Cited

U.S. PATENT DOCUMENTS 4,321,645  3/1982  Thom et al. ........................ 361/63
4,403,292  9/1983  Ejzak et al. ....................... 364/492

Primary Examiner—Jeffrey A. Gaffin
Assistant Examiner—Stephen Jackson
Attorney, Agent, or Firm—Jeffery J. Makeever

[57] ABSTRACT

A system and method of protection against the passive loss of differential current fault protection is provided for an electric power generating system (EPGS). The EPGS utilizes a bus power control unit (BPCU) to control and protect bus configuration, and a generator control unit to control each of the generators. This system and method protection protects against perpetuation of a bus fault on a left air vehicle distribution bus, a right air vehicle distribution bus, or a air vehicle tie bus during passive loss of normal differential current fault protection within the BPCU, and comprises circuitry for monitoring parameters of the generator output power, circuitry responsive to these parameters for detecting a high generator current condition for generating an output overload signal when the parameters indicate the presence of a bus fault. Circuitry located within the BPCU responsive to and in coordination with the output overload signal discriminates a location of the bus fault between the left and the right generator buses, the left and the right air vehicle distribution buses, and the air vehicle tie bus by selectively tripping breakers and thereafter monitoring the effect on the output overload signal. If the bus fault is discriminated to be located on the generator's bus, the BPCU allows the air vehicle distribution bus to be re-powered by another generator.

15 Claims, 3 Drawing Sheets

SYSTEM AND METHOD OF ISOLATION FOR DETECTING A PASSIVE PROTECTIVE FUNCTION FAILURE FOR AN ELECTRIC POWER GENERATING SYSTEM

FIELD OF THE INVENTION

The present invention relates generally to protection systems for electric power generating systems, and more particularly to a system of protection which detects the passive loss of a main protective function to prevent the loss of all electric power to main distribution busses in the presence of a subsequent active fault in the system.

BACKGROUND ART

FIG. 1 illustrates a prior an electric power generating system (EPGS) 7 of the type manufactured by the assignee of the present invention for use in airframes. The EPGS 7 is comprised of a plurality of generating channels 37a, 37b, 37c, 37d. Each channel comprises a generator unit such as an integrated drive generator 9 coupled to an input shaft (not illustrated) from an airframe propulsion engine. The output of the IDG 9 is connectable by a generator control breaker (GCB) 31 to a load distribution bus 23 which is connectable by a bus tie breaker (BTB) 29 to a tie bus 35. Position control for each breaker is transmitted via control line 33 to the GCB 31, and via control line 27 to the BTB 29. Each IDG 9 is conventional and is comprised of a constant speed transmission and a permanent magnet generator which generates alternating current which is rectified and applied, through a series connected generator control relay (GCR) (not illustrated), to a wound field exciter on line 19 which produces alternating current which is rectified and applied to the rotor of a three phase alternator. The number of IDGs 9 included in the EPGS 7 varies with the airframer's requirements based on electrical load, and typically is between 2 and 4. The rotor of the three phase alternator is driven by the constant speed transmission (included within the IDG 9) which converts a variable speed shaft from the airframe propulsion engine into a constant speed drive which rotates the rotor of the three phase alternator at a velocity for producing three phase 400 Hz electrical power. Each IDG 9 has an associated generator control unit (GCU) 11 which may contain a programmed microprocessor or other means for implementing various conventional control and protection functions as well as functions which are described below which are part of the present invention.

In addition to the main engine driven IDGs 9, an auxiliary power unit driven generator unit (AGEN) 13 is often included as an integral part of the EPGS 7. The AGEN 13 is connectable by an auxiliary power breaker (APB) 39 to an air vehicle tie bus 41 to allow the AGEN 13 to power the left air vehicle distribution bus 43 and the right air vehicle distribution bus 45 via the left bus tie breaker (LBTB) 47 and the right bus tie breaker (RBTR) 49 during IDG fault or loss of engine conditions, or while on the ground without main engines running. Also included is a connection 17 to allow external power (EXT PWR) to be connected though an external power contactor (EPC) 51 to the air vehicle tie bus 41 to supply the left air vehicle distribution bus 43 and the right air vehicle distribution bus 45 through the LBTB 47 and the RBTB 49 while on the ground.

The left air vehicle distribution bus 43 is also coupled through a left main breaker (LMB) 53 to one of the main channels 37b, while the right vehicle distribution bus 45 is coupled through a right main breaker (RMB) 55 to another main channel 37c. The coordination of the configuration of the LMB 53 and the LBTB 47 is accomplished within an associated bus power control unit (BPCU) 57a, and the RBTB 49 and the RMB 55 is accomplished within an associated BPCU 57b. The BPCU 57 senses various system operating parameters and coordinates operation of the breakers.

The control of the electric power system 7 allows both parallel and isolated modes of operation. In parallel operation, all of the distribution busses 23 are coupled together through closed BTBs 29, and the electrical loads are shared equally by each of the generators. In this mode of operation the LMB 53 and the RMB 55 are also closed. In this way, the total power available for fault clearing is several times that of a single generator, and the system response to transients is likewise more robust. However, in many operating conditions, such as take-off and landing, the IDGs are operated in an isolated mode, supplying only the loads connected to its individual load distribution bus. In these situations, the control must provide for rapid power transfers between and among the power sources to ensure a continued supply of electric power to all aircraft distribution buses. If a source of electric power trips off line due to a generator fault or is shut down, the control automatically couples that source's distribution bus to an energized bus to maintain a source of electric power for the connected loads.

In addition to the system of distribution control, a system of protection protects the utilization equipment from abnormal operating conditions such as over and under voltage, over and under frequency, etc., and protects the generators and the airframe from bus faults such as differential current faults. A differential current fault is a short circuit along the main power feeders coupling the generators to the load distribution busses. This type of fault is called a differential current fault because it is sensed by measuring the current supplied to the feeders at the generator and comparing this value to the value of current delivered to the loads. A difference or differential between these two values indicates a fault somewhere between these two points. A differential current fault is isolated very quickly on an aircraft for several reasons. First, a short circuit will draw large amounts of current which may pose a fire hazard if allowed to persist for long periods of time. Second, because the generators are not infinitely stiff (only have a limited capacity to supply loads), the short circuit tends to droop the bus voltage rather quickly.

The isolation of the faulted feeders displaying the differential current fault is provided by the protection logic, and the reconfiguration of the breakers to re-power unfaulted busses is provided by the control logic of both the GCUs 11 and the BPCU 57. If a differential current fault exists between the IDG 9 and the GCB 31 with the system operating in parallel, the first step of isolation is to trip that channel's BTB 29. Since the fault is still coupled to the IDG 9, it will still be sensed and the protection logic within the GCU 11 will trip the GCB 31. The fault will still be sensed because it is upstream of the open GCB 31 and the protection will then de-energize the IDG 9. At this point the control logic will sense a dead distribution bus 23, and will close the BTB 29 to allow the other IDGs to supply the electrical loads through the BTB 29. If, on the other hand, the differential current fault is actually located on the one of the main distribution buses 43, 45, the fault will be cleared upon tripping of the GCB 31. In this case, the control logic is precluded from re-closing the BTB 29 because the differential current protection logic has isolated the short circuit to the main distribution bus. The loads powered from this bus will remain de-energized.

In systems such as that illustrated in FIG. 1 which utilize air vehicle distribution buses 43, 45 for essential loads, isolation and reconfiguration of differential current faults is somewhat more complicated. Since these busses 43, 45 power essential loads, such as the flight control computers, communications, radar systems, etc., the control logic contained within the BPCU 57 operates to keep these busses energized if at all possible. When a differential current fault is detected on one of these air vehicle busses, however, the reconfiguration logic of the BPCU 57 is locked out to prevent unfaulted channels from tripping off line. In this event, one of the air vehicle buses 43 or 45 is left unpowered with its associated breakers open (LMB 53 and LBTB 47, or RMB 55 and RBTB 49).

To prevent any of these critical pieces of utilization equipment from remaining unpowered under this type of fault, however, they typically have a power input from both of these buses, or a redundant piece of equipment is coupled to the other air vehicle bus. For this system of redundancy to work, however, no single failure may results in loss of power to both air vehicle distribution busses 43, 45. Additionally, because of the essential nature of electric power on an aircraft, electric power system overall redundancy requirements require that no combination of a single passive fault in combination with an active fault may result in loss of all electric power to these busses 43, 45 either. A passive fault is one which cannot be detected when it occurs, such as loss of a protective function. An active fault is one which has an immediate system effect, such as a differential current fault.

With the system of protection and reconfiguration control described above, the combination of a passive loss of differential current protection with an active differential current fault on one of the air vehicle distribution buses 43 may result in a loss of all main ac power to both of these buses as follows. With the system operating in parallel (GCB1, GCB2, GCB3, GCB4, BTB1, BTB2, BTB3, BTB4, LMB, RMB all closed) and the differential current fault protection failed for the BPCU 57, initiation of a differential current fault on the left air vehicle bus 43 will cause BTB2 to trip due to under-excitation (a parallel operation protective function), followed by GCB2 tripping on an under-voltage fault. Once GCB2 trips, the control logic will sense the de-energized bus and re-close BTB2. This subjects the other IDGs to the fault through their respective BTBs. Due to the excessive current drawn by the fault, all of the closed BTBs will trip due to under-excitation. Once again, the left air vehicle bus will be sensed as unpowered. At this point, the BPCU 57 will reconfigure the system by tripping the LMB 53, and closing the LBTB 47 and the RBTB 49 in an effort to re-power the left air vehicle bus 43. IDG3 will now be supplying the fault. The high current drawn by the fault will result in an under voltage condition to be sensed for IDG3, and the under voltage protection of the GCU 11 will trip GCB3. This results in both of the air vehicle busses being unpowered as a result of a single passive and a single active fault, and is unacceptable on modem aircraft.

It is therefore a principle objective of the instant invention to provided a system of protection which will not allow a single passive and a single active fault to result in loss of main ac power to both air vehicle distribution busses. It is a further object of the invention to provide a system of protection capable of sensing the loss of differential current protection during a differential current fault. Further, it is an object of the instant invention to provide a system of protection which will lock out the normal reconfiguration control logic in the presence of a differential current fault when the normal differential current protection has been lost.

SUMMARY OF THE INVENTION

A system of protection in accordance with the principles of the instant invention for an electric power generating system such as that described above with reference to FIG. 1, comprises circuitry within a generator control unit for monitoring parameters of the generator output power, such as the output current and bus voltage. Circuitry coupled to the monitoring circuitry and responsive to the output parameters of each generator detects a high generator current condition and generates an output overload signal in response. This signal is communicated to circuitry within the BPCU (who's normal bus fault protection circuitry is passively failed) for discriminating a location of a bus fault between the left and the right generator buses, the left and the right air vehicle distribution buses, and the air vehicle tie bus.

This system of protection performs this discrimination by monitoring the status of the main breaker and bus tie breaker associated with the output overload signal (if the output overload signal is generated by the left GCU, the protection system monitors the left main breaker and the left bus tie breaker), and selectively tripping these associated breakers. The discrimination is completed by monitoring for a continued presence of the output overload signal after the selective tripping of each associated breaker. For example, when the associated main breaker and bus tie breaker are closed upon initiation of the output overload signal, the BPCU discriminates the location of the bus fault to the air vehicle tie bus when said output overload signal is reset following selective tripping of the associated bus tie breaker. If the output overload signal is not reset, the BPCU trips the associated main breaker, and if the signal is reset, the fault is isolated to the associated air vehicle bus. If the output overload signal is not reset after each of these breakers are tripped, the bus fault must be on the generator bus. In this case, the BPCU allows the air vehicle distribution bus to be re-powered through the air vehicle tie bus by allowing the normal control to close the left and right bus tie breakers.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
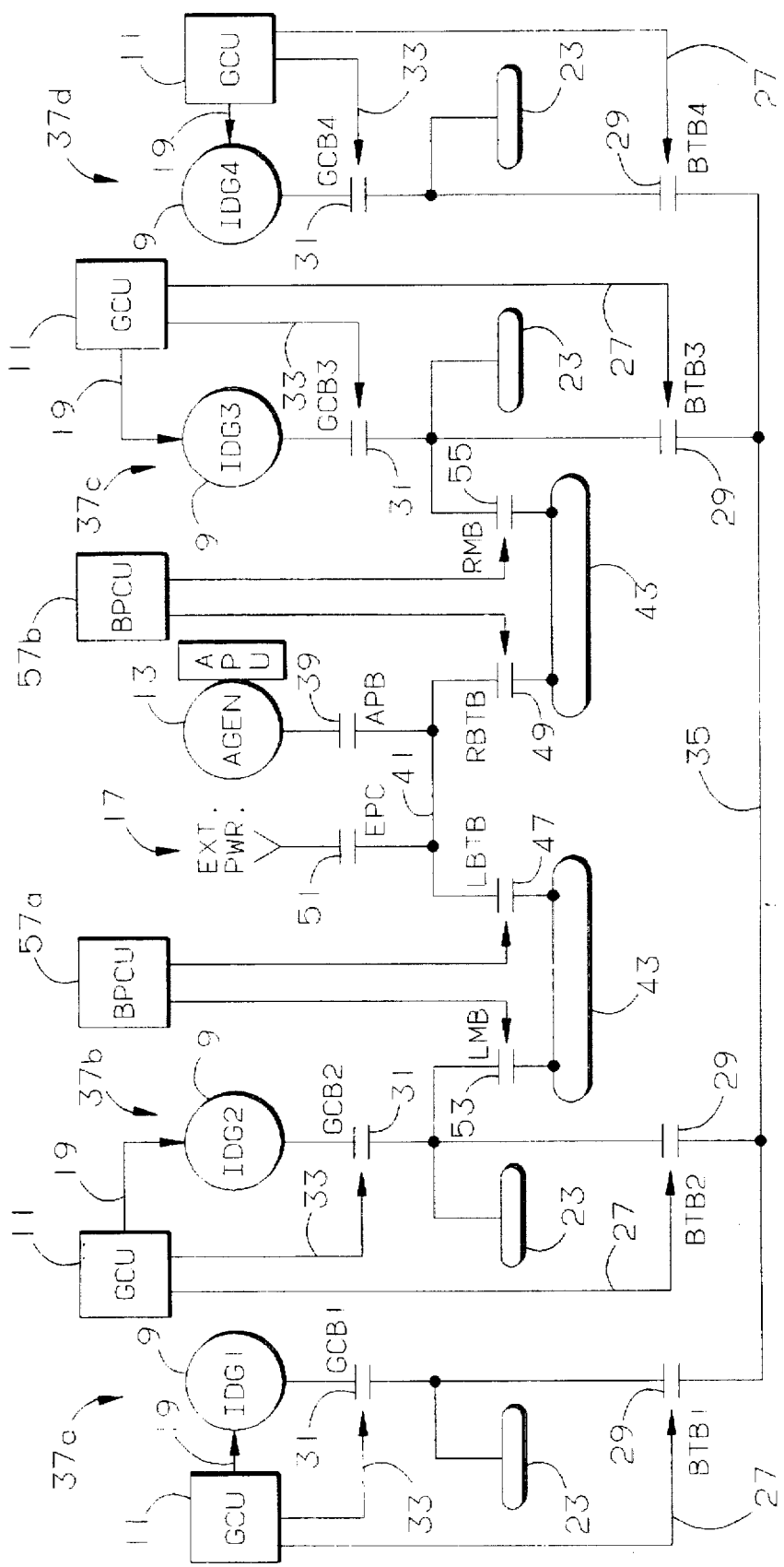
FIG. 1 is a schematic single line diagram of a typical electric power generating system architecture suitable for use with the instant invention.
Figure 2:
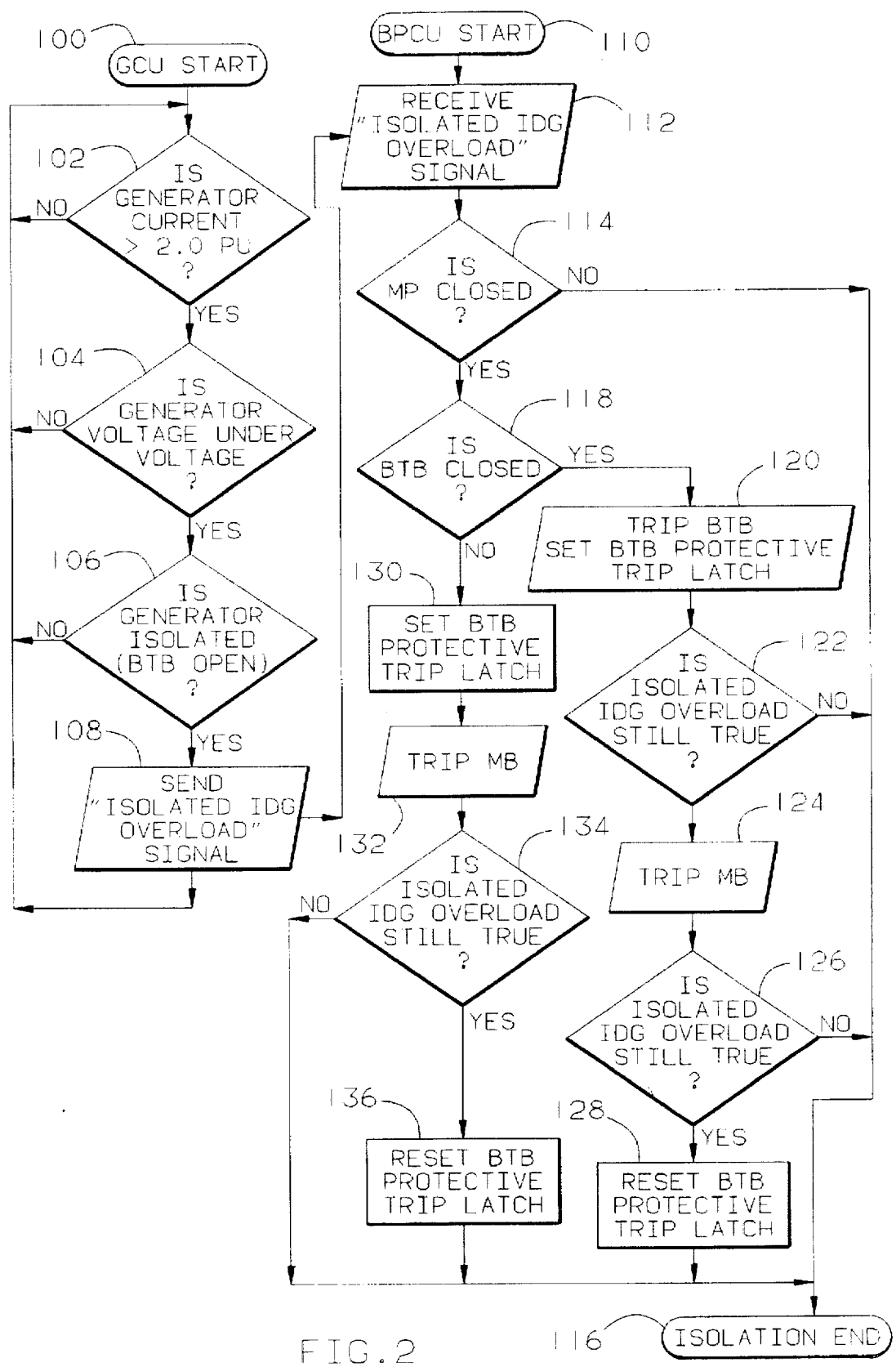
FIG. 2 is a flow diagram in accordance with the instant invention.

In an embodiment of the present invention, as illustrated by the flow diagram of FIG. 2, the protection against perpetuation of a bus fault resulting in a loss of electric power to both the left and right air vehicle buses 43, 45 (see FIG. 1) due to the passive loss of differential current protection within the BPCU 57 begins at block 100 in the GCU 11 of the generator which is supplying the bus fault. For illustration purposes it will be assumed that the generator supplying the bus fault is that of channel 37b, although the principles discussed below apply with equal force if the channel faulted is 37c. Additionally, the term "associated" breakers or bus means the breakers or bus connected to the faulted channel, e.g. if channel 37b is supplying the bus fault, the associated main breaker is the LMB 53, the associated bus tie breaker is LBTB 47, and the associated air vehicle distribution bus is the left air vehicle distribution bus 43.

The GCU monitors the generator output current against a predetermined threshold at step 102. This threshold is set based on system requirements, and is preferably 2.0 per unit. If the generator output current exceeds this predetermined threshold, step 104 monitors the voltage against a predetermined voltage. This threshold is also set based on system requirements, and is preferably set to 104 volts for a 115 volt system. If these two conditions are met, and the channel is isolated as verified by block 106, an output overload signal is sent 108 to the BPCU. The monitoring of these conditions is continuous so that if any condition is no longer satisfied, the output overload signal is reset.

The BPCU starts 110 its isolation by receiving 112 the output overload signal from the GCU. Upon receipt 112, the BPCU monitors the status of the associated main breaker 114. If the associated main breaker is open, the isolation ends 116 because the bus fault cannot be on the associated air vehicle bus since it is not connected to the generator (the associated main breaker is open). Since the fault cannot be on the associated air vehicle distribution bus, it cannot be perpetuated by allowing normal BPCU control to power it from another generating channel. However, if the associated main breaker is closed, the associated bus tie breaker is monitored 118. If it too is closed, it is first tripped and a protective latch is set 120. The output overload signal is then checked 122 to determine if the tripping of the associated bus tie breaker has isolated the fault. If the signal is reset, the isolation ends 116 and the BPCU has isolated the fault to the air vehicle tie bus. If the signal is still present, however, the associated main breaker is tripped 124. Once again the output overload signal is checked 126. If the signal is reset the isolation ends 116 and the BPCU has isolated the bus fault to the associated air vehicle distribution bus. If the output overload signal is still present, the BTB protective latch is reset 128 to allow normal BPCU control to re-power the associated air vehicle distribution bus because the bus fault cannot be on this bus. In this situation, the fault must be on the generator's bus, and will be isolated when a thermal circuit breaker associated with the generator bus trips, or when the associated GCB trips on under voltage.

If, at block 118, the associated BTB was not closed, its protective trip latch is set 130, and the associated main breaker is tripped 132. The output overload signal is then monitored 134 to determine if it is still set. If the output overload signal is reset once the associated main breaker is tripped, the isolation ends 116 as the fault must be on the associated air vehicle distribution bus. If the output overload signal is still true after having tripped the associated main breaker, the associated BTB protective trip latch is reset 136 to allow normal BPCU control to re-power the associated air vehicle distribution bus because the bus fault cannot be on this bus. In this situation, the fault must be on the generator's bus, and will be isolated when a thermal circuit breaker associated with the generator bus trips, or when the associated GCB trips on under voltage.

Figure 3:
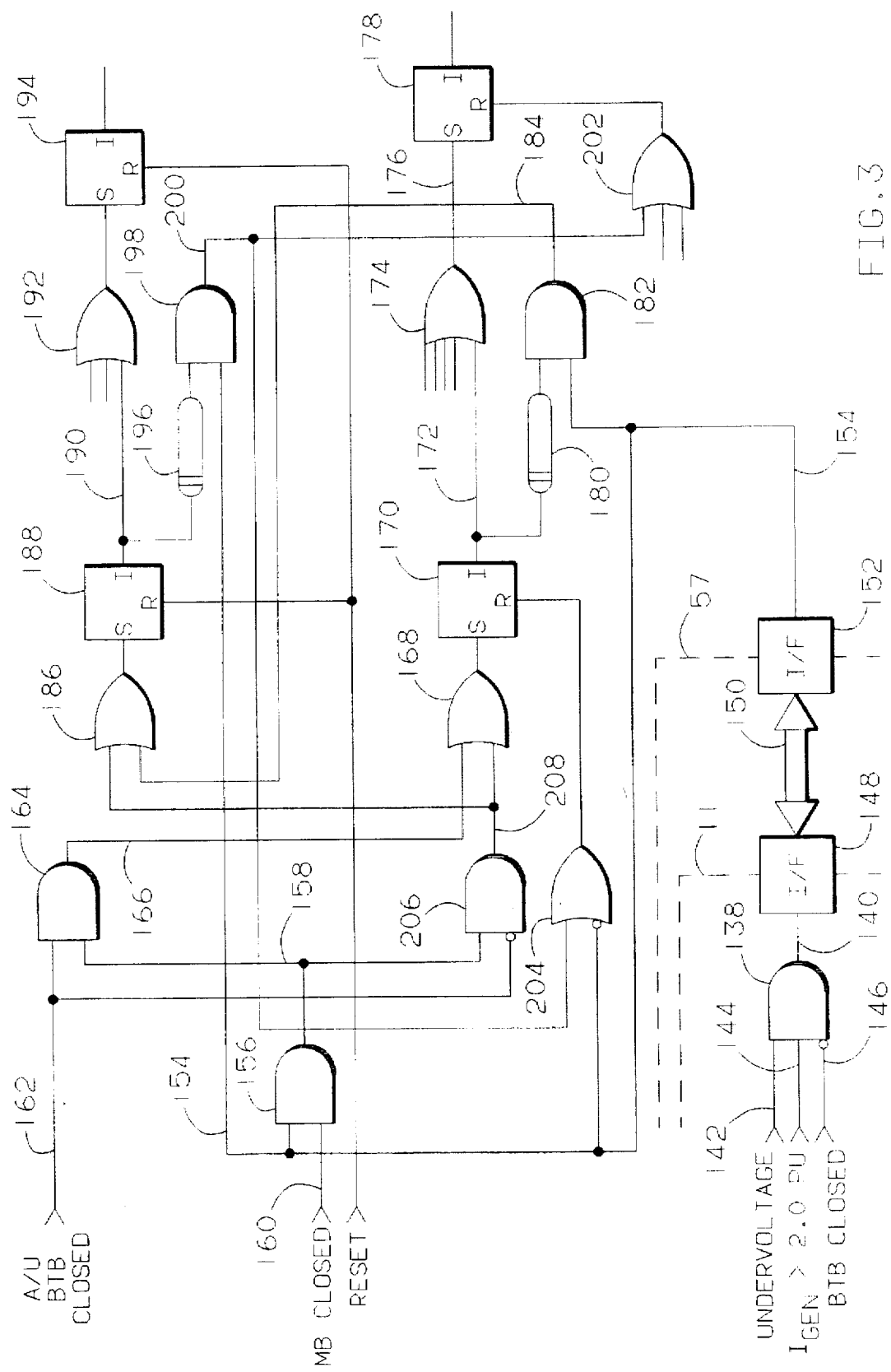
FIG. 3 is a logic diagram of the protection system of the instant invention.

A logic circuit in accordance with an embodiment of the instant invention is illustrated in FIG. 3. Logical AND gate 138 is located within the GCU 11 and generates the output overload signal on line 140 when the generator output voltage is sensed as under voltage on line 142, the generator output current is greater than 2.0 per unit on line 144, and the associated BTB 29 is sensed as not closed on line 146. The output overload signal is conditioned by interface circuitry 148 and communicated to the BPCU 57. This signal may be sent on a communications bus 150, or may be sent by discrete wire, fiber optic cable, or other acceptable media. The BPCU 57 receives and conditions this signal by interface circuitry 152 to line 154.

Upon receipt of the output overload signal on line 154 within the BPCU 57, logical AND gate 156 generates an output on line 158 if the associated main breaker is closed as indicated as a logical 1 on line 160. If the associated bus tie breaker is closed, as indicated as a logical 1 on line 162, logical AND gate 164 generates an output on line 166. This output on line 166 will cause logical OR gate 168 to set latch 170. The output of latch 170 on line 172 will cause logical OR gate 174 to generate an output on line 176 which will set the associated bus tie breaker protective trip latch 178 and trip the associated bus tie breaker. If the output overload signal is still present on line 154 after a time delay 180, logical AND gate 182 will generate an output on line 184. This signal on line 184 will cause logical OR gate 186 to set latch 188. The output of this latch 188 on line 190 will cause logical OR gate 192 to set the associated main breaker trip latch 194, thereby tripping the associated main breaker. If the output overload signal is still present on line 154 after a time delay 196, logical AND gate 198 will generate an output on line 200. This signal on line 200 will cause logical OR gate 202 to reset the associated bus tie breaker protective trip latch 178, and logical or gate 204 to reset latch 170, allowing normal BPCU control of the associated bus tie breaker to return.

If, however, when the output on line 158 is generated the associated bus tie breaker is not closed, logical AND gate 206 generates an output on line 208. This output will cause logical OR gate 168 to set latch 170. The output of latch 170 on line 172 will cause logical OR gate 174 to generate an output on line 176 which will set the associated bus tie breaker protective trip latch 178 as described above. The output on line 208 will also cause logical OR gate 186 to set latch 188. The output of this latch 188 on line 190 will cause logical OR gate 192 to set the associated main breaker trip latch 194, thereby tripping the associated main breaker as described above. If the output overload signal is still present on line 154 after a time delay 196, logical AND gate 198 will generate an output on line 200. This signal on line 200 will cause logical OR gate 202 to reset the associated bus tie breaker protective trip latch 178, and logical or gate 204 to reset latch 170, allowing normal BPCU control of the associated bus tie breaker to return as described above.

The coordination of the values of the time delays 180 and 196 is based on system response and isolation requirements. Also detection and transmission delays must be factored in setting these values. It has been found that utilization of an ARINC data bus 150 may introduce a delay of approximately 30 milliseconds into the detection and isolation logic. Breaker operation and debounce times, as well as worst case cycle times within the control units also may introduce delays into the actual operation of the system. A value of approximately 200 milliseconds has yielded acceptable system isolation performance, eliminating the possibility of perpetuating a bus fault in the presence of a passive failure of the BPCU's differential current fault protection logic resulting in loss of power to both air vehicle busses.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A system of protection for an electric power generating system having at least a left and a right generator electrically coupled to a left and a right generator bus, through a left and a right main breaker to a left and a right air vehicle distribution bus, respectively, the left and the right air vehicle distribution buses being electrically coupled through a left and a right bus tie breaker and an air vehicle tie bus to one another, control for the left main breaker, the right main breaker, the left bus tie breaker, and the right tie breaker and protection of the left air vehicle distribution bus, the right air vehicle distribution bus, and the air vehicle tie bus being provided by a bus power control unit (BPCU), control for each of the generators being provided by an associated generator control unit (GCU), the system of protection protecting against perpetuation of a bus fault on the left air vehicle distribution bus, the right air vehicle distribution bus, or the air vehicle tie bus during passive loss of normal protection within the BPCU, comprising:

means for monitoring parameters of the generator output power;

means coupled to said monitoring means and responsive to said parameters for detecting a high generator current condition, said discriminating means generating an output overload signal in response thereto;

means responsive to and in coordination with said output overload signal for discriminating a location of a bus fault between the left and the right generator buses, the left and the right air vehicle distribution buses, and the air vehicle tie bus; and wherein said monitoring means generator output current and generator output voltage; and wherein said discriminating means generates said output overload signal in response to said generator output current exceeding a first predetermined threshold and said generator output voltage drooping below a second predetermined threshold; and wherein the generators are further coupled through a first and a second bus tie breaker to a tie bus, wherein said discriminating means disables said output overload signal when the generator is coupled to the tie bus.

2. A method of isolation for detecting a passive protective function failure for an electric power generating system having at least a left and a right generator electrically coupled to a left and a right generator bus, through a left and a right main breaker to a left and a right air vehicle distribution bus, respectively, the left and the right air vehicle distribution buses being electrically coupled through a left and a right bus tie breaker and an air vehicle tie bus to one another, control for the left main breaker, the right main breaker, the left bus tie breaker, and the right tie breaker and protection of the left air vehicle distribution bus, the right air vehicle distribution bus, and the air vehicle tie bus being provided by a bus power control unit (BPCU), control for each of the generators being provided by an associated generator control unit (GCU), the system of protection protecting against perpetuation of a bus fault on the left air vehicle distribution bus, the right air vehicle distribution bus, or the air vehicle tie bus during passive loss of normal differential fault current protection within the BPCU, the method comprising the steps of:

monitoring generator output current for each generator;

generating an output overload signal in response to the generator output current exceeding a predetermined threshold; and selectively controlling the left main breaker, the right main breaker, the left bus tie breaker, and the right tie breaker in response to and in coordination with the output overload signal being set.

3. A method of isolation for a detecting a passive protective function failure for an electric power generating system having at least a left and a right generator electrically coupled to a left and a right generator bus, through a left and a right main breaker to a left and a right air vehicle distribution bus, respectively, the left and the right air vehicle distribution buses being electrically coupled through a left and a right bus tie breaker and an air vehicle tie bus to one another, control for the left main breaker, the right main breaker, the left bus tie breaker, and the right tie breaker and protection of the left air vehicle distribution bus, the right air vehicle distribution bus, and the air vehicle tie bus being provided by a bus power control unit (BPCU), control for each of the generators being provided by an associated generator control unit (GCU), the system of protection protecting against perpetuation of a bus fault on the left air vehicle distribution bus, the right air vehicle distribution bus, or the air vehicle tie bus during passive loss of normal protection within the BPCU, the method comprising the steps of:

monitoring generator output current for each generator;

generating an output overload signal in response to the generator output current exceeding a predetermined threshold; and selectively controlling the left main breaker, the right main breaker, the left bus tie breaker, and the right tie breaker in response to and in coordination with the output overload signal being set; and wherein an associated main breaker is closed and an associated bus tie breaker is open, and wherein the step of selectively controlling comprises the steps of:

tripping the associated main breaker;

thereafter monitoring the output overload signal; and discriminating a location of the bus fault to the air vehicle distribution bus when the output overload signal is reset following said step of tripping the associated main breaker.

4. A method of isolation for detecting a passive protective function failure for an electric power generating system having at least a left and a right generator electrically coupled to a left and a right generator bus, through a left and a right main breaker to a left and a right air vehicle distribution bus, respectively, the left and the right air vehicle distribution buses being electrically coupled through a left and a right bus tie breaker and an air vehicle tie bus to one another, control for the left main breaker, the right main breaker, the left bus tie breaker, and the right tie breaker and protection of the left air vehicle distribution bus, the right air vehicle distribution bus, and the air vehicle tie bus being provided by a bus power control unit (BPCU), control for each of the generators being provided by an associated generator control unit (GCU), the system of protection protecting against perpetuation of a bus fault on the left air vehicle distribution bus, the right air vehicle distribution bus, or the air vehicle tie bus during passive loss of normal protection within the BPCU, the method comprising the steps of:

monitoring generator output current for each generator;

generating an output overload signal in response to the generator output current exceeding a predetermined threshold; and selectively controlling the left main breaker, the right main breaker, the left bus tie breaker, and the right tie breaker in response to and in coordination with the output overload signal being set; and wherein an associated main breaker and an associated bus tie breaker are closed, and wherein the step of selectively controlling comprises the steps of:

tripping the associated bus tie breaker;

thereafter monitoring the output overload signal; and discriminating a location of the bus fault to the air vehicle tie bus when the output overload signal is reset following said step of tripping an associated bus tie breaker.

5. The method of claim 4, wherein the step of selectively controlling further comprises the steps of:

tripping the associated main breaker;

thereafter monitoring the output overload signal; and discriminating a location of the bus fault to the air vehicle distribution bus when the output overload signal is reset following said step of tripping an associated main breaker.

6. A system of protection for an electric power generating system having at least a left and a right generator electrically coupled to a left and a right generator bus, through a left and a right main breaker to a left and a right air vehicle distribution bus, respectively, the left and the right air vehicle distribution buses being electrically coupled through a left and a right bus tie breaker and an air vehicle tie bus to one another, control for the left main breaker, the right main breaker, the left bus tie breaker, and the right tie breaker and protection of the left air vehicle distribution bus, the right air vehicle distribution bus, and the air vehicle tie bus being provided by a bus power control unit (BPCU), control for each of the generators being provided by an associated generator control unit (GCU), the system of protection protecting against perpetuation of a bus fault on the left air vehicle distribution bus, the right air vehicle distribution bus, or the air vehicle tie bus during passive loss of normal differential fault current protection within the BPCU, comprising:

means for monitoring parameters of the generator output power;

means coupled to said monitoring means and responsive to said parameters for detecting a high generator current condition, said discriminating means generating an output overload signal in response thereto; and means responsive to and in coordination with said output overload signal for discriminating a location of a bus fault between the left and the right generator buses, the left and the right air vehicle distribution buses, and the air vehicle tie bus.

7. The protection system of claim 1, wherein said monitoring means monitors generator output current and generator output voltage.

8. The protection system of claim 7, wherein said discriminating means generates said output overload signal in response to said generator output current exceeding a first predetermined threshold and said generator output voltage drooping below a second predetermined threshold.

9. The protection system of claim 8, wherein said output overload signal is reset when said generator output current is below said first predetermined threshold, and further wherein said output overload signal is reset when and said generator output voltage exceeds said second predetermined threshold.

10. A system of protection for an electric power generating system having at least a left and a right generator electrically coupled to a left and a right generator bus, through a left and a right main breaker to a left and a right air vehicle distribution bus, respectively, the left and the right air vehicle distribution buses being electrically coupled through a left and a right bus tie breaker and an air vehicle tie bus to one another, control for the left main breaker, the right main breaker, the left bus tie breaker, and the right tie breaker and protection of the left air vehicle distribution bus, the right air vehicle distribution bus, and the air vehicle tie bus being provided by a bus power control unit (BPCU), control for each of the generators being provided by an associated generator control unit (GCU), the system of protection protecting against perpetuation of a bus fault on the left air vehicle distribution bus, the right air vehicle distribution bus, or the air vehicle tie bus during passive loss of normal protection within the BPCU, comprising:

means for monitoring parameters of the generator output power;

means coupled to said monitoring means and responsive to said parameters for detecting a high generator current condition, said discriminating means generating an output overload signal in response thereto;

means responsive to and in coordination with said output overload signal for discriminating a location of a bus fault between the left and the right generator buses, the left and the right air vehicle distribution buses, and the air vehicle tie bus; and wherein said discriminating means monitors a status of an associated main breaker and bus tie breaker in response to said output overload signal, said discriminating means selectively tripping said associated main breaker and bus tie breaker, said discriminating means monitoring for a continued presence of said output overload signal after said selective tripping.

11. The protection system of claim 10, wherein the associated main breaker is closed and associated bus tie breaker is open upon initiation of said output overload signal, and wherein said discriminating means isolates the location to the air vehicle distribution bus when said output overload signal is reset following selective tripping of the associated main breaker.

12. The protection system of claim 11, wherein said discriminating means isolates the location to the generator bus when said output overload signal is not reset following selective tripping of the associated main breaker.

13. The protection system of claim 10, wherein the associated main breaker and bus tie breaker are closed upon initiation of said output overload signal, and wherein said discriminating means isolates the location to the air vehicle tie bus when said output overload signal is reset following selective tripping of the associated bus tie breaker.

14. The protection system of claim 13, wherein said discriminating means isolates the location to the air vehicle distribution bus when said output overload signal is reset following selective tripping of the associated main breaker.

15. The protection system of claim 14, wherein said discriminating means isolates the location to the generator bus when said output overload signal is not reset following selective tripping of the associated main breaker and bus tie breaker.

* * * * *